United States Patent [19]

Finster et al.

[11] 4,171,232
[45] Oct. 16, 1979

[54] ALUMINOTHERMIC REACTION MIXTURE BASED ON CUPRIC OXIDE

[75] Inventors: Theodor Finster, Hattingen; Hans-Dieter Fricke, Essen-Stadtwald, Horst Schümann, Mülheim, All of Fed. Rep. of Germany

[73] Assignee: Th. Goldschmidt AG, Fed. Rep. of Germany

[21] Appl. No.: 496,863

[22] Filed: Aug. 12, 1974

[30] Foreign Application Priority Data

Dec. 20, 1973 [DE] Fed. Rep. of Germany ....... 2363520

[51] Int. Cl.$^2$ .............................................. C21B 15/02
[52] U.S. Cl. .......................................... 148/24; 75/27
[58] Field of Search .................. 75/72, 74, 23, 26, 27, 75/134 S, 134 A, 162, 27; 148/24, 27, 23

[56] References Cited

U.S. PATENT DOCUMENTS

| | | | |
|---|---|---|---|
| 2,229,045 | 1/1941 | Cadwell | 75/27 |
| 2,266,122 | 12/1941 | Kinzel | 75/134 S |
| 2,282,175 | 5/1942 | Emerson | 148/24 |
| 2,513,602 | 7/1950 | Udy | 75/27 |
| 2,801,914 | 8/1957 | Burke | 75/27 |
| 2,870,498 | 1/1959 | Rejdak | 75/27 |
| 2,888,342 | 5/1959 | Fraser | 75/27 |
| 3,116,141 | 12/1963 | Rylander et al. | 75/27 |
| 3,215,525 | 11/1965 | Sprankle | 75/134 S |
| 3,772,095 | 11/1973 | Shapiro et al. | 75/162 |
| 3,902,891 | 9/1975 | Finster et al. | 75/27 |

FOREIGN PATENT DOCUMENTS 770757 3/1957 United Kingdom ...................... 75/27

OTHER PUBLICATIONS

Hodgman, C (Ed.) *Handbook of Chemistry and Physics*, (37th Ed.) Cleveland, 1955, pp. 3064–3065.
Weast, R.; (Ed.) Ibid, (55th Ed.), 1974, p. F–147.

*Primary Examiner*—M. J. Andrews
*Attorney, Agent, or Firm*—James E. Bryan

[57] ABSTRACT

This invention relates to an aluminothermic reaction mixture, for preparing a metallic melt composed primarily of copper, having the following composition 70 to 75 parts by weight of cupric oxide with an oxygen content of >14 to 15% by weight,
25 to 30 parts by weight of aluminum/copper alloy in a weight ratio of about 1:1 with a particle size of >0.15 mm and <1.0 mm, and
0.1 to 0.5 part by weight of finely divided carbon with a particle size of <0.2 mm.

3 Claims, No Drawings

ALUMINOTHERMIC REACTION MIXTURE BASED ON CUPRIC OXIDE

The present invention relates to an aluminothermic reaction mixture for preparing a metallic melt composed primarily of copper, which is particularly useful for welding copper cables and grounding cables on rails.

In the aluminothermic reaction, use is made of the great affinity of aluminum to oxygen, whereby, during the formation of the aluminum oxide, such thermal effects arise that the metallic oxide which furnishes the oxygen is reduced and the resultant metal and the aluminum oxide are melted down. Best known is the reaction between iron oxide and aluminum, whereby metallic supplements still may be added to the reaction mixture in order that one may obtain an iron alloy melt which is employed on a large scale for welding rail ends, for repair welding, and the like.

A variation of the aluminothermic process that recently has been utilized technically only resides in the replacement of the iron oxide by copper oxide, whereby copper melts are obtained which are employed for specific purposes. An example of such an application is the welding of copper cables onto rails for bridging rail joints, and hence for assuring the current transfer. A further possibility of application of aluminothermic copper welding is the welding of current bridges between the wheel spider and the rim of rubber-suspended streetcar wheels. However, also grounding cables of other metals, for example steel, may be welded with such copper melts. Literature relative to aluminothermic welding based on cupric oxide is found in the periodical "Eisenbahntechnische Rundschau" (Railroad-Technical Review), Number 12, 1969, pages 518, et sequitur.

When carrying out copper cable welding in actual practice, it has been found, however, that on occasion the welds display disturbing pores which impair the mechanical stability of the welds and the flow of current.

It now has been found that this porosity of the welds can be eliminated with certainty if a cupric oxide is used whose oxygen content is within a certain order of magnitude, and if carbon is further added to the reaction mixture of aluminum and cupric oxide.

In this connection, it must be taken into account that what is used is not chemically pure cupric oxide, but that employed instead, as a rule, are powders obtained during copper processing, shavings, or scales obtained during deformation by heat which are in part only superficially oxidized. These are oxidized to the desired oxygen content by treatment in a rotary furnace at elevated temperatures.

Moreover, it has been found that, by virtue of the use of an aluminum/copper alloy in place of pure aluminum, a somewhat braked reaction is assured, which enhances a uniform yield of the melt.

The inventive aluminothermic reaction mixture has the following composition:

70 to 75 parts by weight of cupric oxide with an oxygen content of >14 to 15% by weight, 25 to 30 parts by weight of aluminum/copper alloy in a weight ratio of approximately 1:1 with a particle size of >0.15 mm and <1.0 mm, and 0.1 to 0.5 part by weight of finely divided carbon having a particle size of <0.2 mm.

The welds obtained with this novel reaction mixture display no porosity whatsoever. This was surprising since with the cupric oxide heretofore used having an imprecisely defined oxygen content of about 11 to 13% by weight, the porosity occurred very frequently, or in any event could not be prevented with certainty. It is assumed that by virtue of the increase of the oxygen content the quantity of hydrogen absorbed by the melt is reduced. It could not have been foreseen, however, that these effects occur upon a minor change of the oxygen content in the cupric oxide and the addition of carbon.

An additional improvement of the properties of the welding material may be obtained by the addition of up to 3 parts by weight of tin, and/or up to 1 part by weight of a calcium/silicon alloy with a calcium/silicon weight ratio of 1:2 to 1:2.6, in addition to conventional impurities.

Examples of reaction mixtures composed in accordance with the present invention are the following (all parts by weight):

|       | I   | II  | III | IV  |
|-------|-----|-----|-----|-----|
| CuO   | 75  | 70  | 73  | 71  |
| CuAl  | 25  | 30  | 27  | 29  |
| Sn    | 3   | 3   | —   | 2   |
| Ca/Si | 1   | 1   | 0.8 | 1   |
| C     | 0.4 | 0.3 | 0.5 | 0.2 |

The Ca/Si employed had the following composition:
64.3% by weight: Si
27.3% by weight: Ca
3.6% by weight: Fe
1.97% by weight: Al
0.67% by weight: C
Remainder trace elements and oxygen.

It will be obvious to those skilled in the art that many modifications may be made within the scope of the present invention without departing from the spirit thereof, and the invention includes all such modifications.

What is claimed is:

1. An aluminothermic reaction mixture, for preparing a metallic melt composed primarily of copper, having the following composition 70 to 75 parts by weight of cupric oxide with an oxygen content of >14 to 15% by weight, 25 to 30 parts by weight of aluminum copper alloy in a weight ratio of about 1:1 with a particle size of >0.15 mm and <1.0 mm, and 0.1 to 0.5 part by weight of finely divided carbon with a particle size of <0.2 mm.

2. A reaction mixture according to claim 1 including tin in an amount up to 3 parts by weight, and a calcium-silicon alloy in an amount up to 1 part by weight, said alloy having a calcium-silicon weight ratio of 1:2 to 1:2.6, in addition to conventional impurities.

3. A reaction mixture according to claim 1 including a calcium-silicon alloy in an amount up to 1 part by weight, said alloy having a calcium-silicon weight ratio of 1:2 to 1:2.6, in addition to conventional impurities.

* * * * *